US010165488B2

(12) United States Patent
Demchenko

(10) Patent No.: US 10,165,488 B2
(45) Date of Patent: Dec. 25, 2018

(54) METHOD OF AND SYSTEM FOR PROCESSING A TRANSACTION REQUEST IN DISTRIBUTED DATA PROCESSING SYSTEMS

(71) Applicant: YANDEX EUROPE AG, Lucerne (CH)

(72) Inventor: Grigory Victorovich Demchenko, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 8 days.

(21) Appl. No.: 15/606,241

(22) Filed: May 26, 2017

(65) Prior Publication Data
US 2017/0367023 A1   Dec. 21, 2017

(30) Foreign Application Priority Data
Jun. 16, 2016   (RU) .................. 2016123959

(51) Int. Cl.
| H04W 36/26 | (2009.01) |
| H04W 36/12 | (2009.01) |
| H04L 12/721 | (2013.01) |
| H04L 12/751 | (2013.01) |
| H04W 36/00 | (2009.01) |

(Continued)

(52) U.S. Cl.
CPC ...... *H04W 36/26* (2013.01); *G06F 17/30371* (2013.01); *H04L 45/28* (2013.01); *H04W 36/12* (2013.01); *H04L 45/02* (2013.01); *H04L 45/44* (2013.01); *H04L 61/103* (2013.01); *H04W 36/0011* (2013.01)

(58) Field of Classification Search
CPC . H04W 36/26; H04W 36/12; H04W 36/0011; H04L 45/28; H04L 45/02; H04L 45/44; H04L 61/103; G06F 17/30371

USPC .......................................................... 370/437
See application file for complete search history.

(56) References Cited

U.S. PATENT DOCUMENTS 6,895,115 B2   5/2005   Tilton
7,099,355 B1   8/2006   Johnson et al.
(Continued)

OTHER PUBLICATIONS

Buchmann et al., "A transaction model for active distributed object systems", GTE Laboratories Incorporated, Waltham, MA, pp. 1-35.

*Primary Examiner* — Faisal Choudhury
(74) *Attorney, Agent, or Firm* — BCF LLP

(57) ABSTRACT

There is disclosed a method of processing a transaction request. The transaction request is associated with a computer transaction which has to be executed in a succeed-or-fail-as-a-whole manner. The method is executable in a distributed processing system having a plurality of nodes. Each of executing nodes is associated with a pre-defined type of the computer transaction and is directly addressable by a controlling node. In response to receiving by the controlling node, from a client device, a transaction request, the controlling node determines, based on the pre-defined type of the computer transaction, a specific node of a set of executing nodes responsible for the pre-defined type of the computer transaction and sends the transaction request directly to the determined specific node for execution thereof. While the determined specific node executed the transaction requests, it blocks receiving of additional transaction requests until the transaction request is executed.

20 Claims, 4 Drawing Sheets

(51) Int. Cl.
*H04L 12/703* (2013.01)
*G06F 17/30* (2006.01)
H04J 3/16 (2006.01)
H04L 29/12 (2006.01)

(56) References Cited

U.S. PATENT DOCUMENTS

| | | | |
|---|---|---|---|
| 7,103,016 B1* | 9/2006 | Duffy | H04L 1/1607 |
| | | | 370/312 |
| 7,421,691 B1 | 9/2008 | Hancock et al. | |
| 7,813,276 B2 | 10/2010 | Gilfix | |
| 8,028,152 B2 | 9/2011 | Glew | |
| 8,953,619 B2 | 2/2015 | Basso et al. | |
| 2006/0023694 A1* | 2/2006 | Wilson | G06Q 20/16 |
| | | | 370/352 |
| 2012/0303628 A1 | 11/2012 | Silvola | |
| 2013/0336209 A1* | 12/2013 | Gage | H04L 12/5691 |
| | | | 370/328 |
| 2014/0082627 A1 | 3/2014 | Manjarekar | |
| 2014/0297652 A1 | 10/2014 | Stevens et al. | |
| 2014/0307537 A1* | 10/2014 | Baer | H04L 65/1016 |
| | | | 370/216 |

\* cited by examiner

METHOD OF AND SYSTEM FOR PROCESSING A TRANSACTION REQUEST IN DISTRIBUTED DATA PROCESSING SYSTEMS

CROSS-REFERENCE

The present application claims priority to Russian Patent Application No. 2016123959, filed Jun. 16, 2016, entitled "METHOD OF AND SYSTEM FOR PROCESSING A TRANSACTION REQUEST IN DISTRIBUTED DATA PROCESSING SYSTEMS" the entirety of which is incorporated herein.

FIELD

The present technology relates to systems and methods for communication in distributed systems. In particular, the systems and methods for processing a transaction request in distributed data processing systems.

BACKGROUND

Distributed systems, also known as distributed computing, generally include a collection of autonomous computational entities or nodes in a network comprising software to produce an integrated computing facility by communicating and coordinating actions by exchanging messages. Distributed systems allow for more efficient task execution due to their size and power, which is superior to a combination of stand-alone systems. Distributed systems have a variety of application fields such as telecommunication networks, real-time process control and parallel computation, among others. Distributed systems may have different architectures such as client-server, three-tier, n-tier, or peer-to-peer, loose coupling or tight coupling.

Distributed systems are used for processing different kind of computer operations, including a type of information transactions that are divided into individual, indivisible computer sub-operations typically referred to as "operations". Each such transaction must succeed or fail as a complete unit. In other words, such the computer transaction can not be "partially completed"—in response to at least one of the constituent operations failing, the entire computer transaction must fail.

Since constituent sub-operations (or transactions) can be executed by different nodes of the distributed system, the underlying premise of transaction processing is designed to maintain system's integrity (for example, data consistency in a database) by ensuring that interdependent operations in the distributed system are either all completed successfully or all canceled successfully.

For example, one of the areas for using the distributed systems is to execute transaction processing in an on-line banking system, where remote client computers (such as laptops, desktops, smartphones, and the like) are used to access an on-line banking server to execute remote transaction on the data maintained by the on-line banking server (such as account data and the like). For illustration purposes, let's assume that the remote transaction is moving $500 from a customer's savings account to a customer's checking account. This transaction involves at least two separate operations in computer terms: debiting a record associated with the savings account by $500, and crediting a record associated with the checking account by $500. If one operation succeeds but the other does not, the books of the bank will not balance. The transaction processing, thus, ensures that either both operations succeed or both fail, so that there is no inconsistency in the bank's database as a whole.

Transaction processing links multiple individual operations into a single transaction, and ensures that either all operations in the single transaction are completed without error, or none of them are. If some of the operations are completed but errors occur when the others are attempted, the transaction processing system "rolls back" all of the operations of the transaction (including the successful ones), thereby erasing all traces of the transaction and restoring the system to the consistent, known state that it was in before processing of the transaction began.

If all operations of the transaction are completed successfully, the transaction is "committed" by the system. In other words, all changes made to the database as a result of the execution of the constituent operations are made permanent—thus, the transaction cannot be rolled back once it is committed.

Transaction processing guards against hardware and software errors that might leave a transaction partially completed. If the computer system crashes in the middle of a transaction, the transaction processing system guarantees that all operations in any uncommitted transactions are cancelled. In certain circumstances, several transaction requests can be issued simultaneously (or substantially simultaneously, for the sequential transaction request is issued right before the previous transaction request is fully executed).

If the two sequentially issues transaction requests overlap (i.e. need to process data stored in the same portion of the database), processing of the two overlapping transaction requests has a potential of creating conflicts. For example, if the customer mentioned in the example above has $550 in his savings account and attempts to transfer $100 to a different person while at the same time moving $500 to the checking account, only one of the overlapping transactions can succeed.

Rather than processing transactions sequentially (which is generally inefficient), the transaction processing in the distributed system is built on a premise that concurrent implementations of transaction processing is executed in a way such that to ensure that the end result reflects a conflict-free outcome, the same as would be reached if executing the transactions sequentially in any order. In the present, this means that no matter which transaction request was issued first, either one the transfer to a different person or the move to the checking account succeeds, while the other one fails.

US 2014/0297652 discloses a computer system identifies high-value information in data streams. The computer system receives a plurality of data streams. Each of the data streams includes a plurality of posts. Each of the posts includes a content portion and one or more source characteristics. In real time, for each post in a particular data stream: the system assigns the post a post identifier; generates a content packet and one or more source packets; queries memory to access a source profile using a respective source identifier included in the content packet; correlates the content packet with information from the source profile to produce a correlated content packet; and broadcasts the correlated content packet to a plurality of filter graph definitions.

U.S. Pat. No. 7,813,276 discloses a network cluster having a plurality of cluster members. In order to control the admission of client requests sent to the cluster, one member of the cluster is elected "reservation coordinator." The reservation coordinator runs a reservation algorithm for controlling the distribution of rate capacity across members of the cluster. For example, each member of the cluster may reserve some amount of rate from the coordinator to allow for passing of client requests. To ensure that each member is provided with the appropriate rate capacity, each member of the cluster runs an estimation algorithm to determine whether or not additional rate capacity should be reserved from the reservation coordinator, or released back into the cluster for redistribution. The estimation algorithm is run in real-time and allows the admission control algorithm to adapt to changes in rate distribution.

U.S. Pat. No. 8,028,152 discloses a hierarchical microprocessor. An embodiment of a hierarchical microprocessor includes a plurality of first-level instruction pipeline elements; a plurality of execution clusters, where each execution cluster is operatively coupled with each of the first-level instruction pipeline elements. Each execution cluster includes a plurality of second-level instruction pipeline elements, where each of the second-level instruction pipeline elements corresponds with a respective first-level instruction pipeline element, and one or more instruction execution units operatively coupled with each of the second-level instruction pipeline elements, where the microprocessor is configured to execute multiple execution threads using the plurality of first-level instruction pipeline elements and the plurality of execution clusters.

SUMMARY

The present technology may ameliorate at least some deficiencies of the prior art with respect to executing an action commit routine in a distributed system without electing a leader.

Developers of the present technology have developed embodiments thereof, based on a premise of organizing a distributed hierarchical transaction data structure (DHTDS). The DHTDS comprises a plurality of nodes, the plurality of nodes including a controlling node and a set of executing nodes. The controlling node is configured to receive transaction requests (the transaction request being associated with a computer transaction which has to be executed in a succeed-or-fail-as-a-whole manner) from remote clients for data modification within the DHTDS. Each of the set of executing nodes within the DHTDS is associated with a pre-defined type of the computer transaction and is directly addressable by the controlling node.

The set of executing nodes within the DHTDS is organized in hierarchical trees, wherein at least one node being a superior node nests a subordinate node. The set of executing nodes is organized in the hierarchy in accordance with the pre-defined type of the computer transaction executable by a given one of the set of executing nodes, such that: the given node of the set of executing nodes is a child node to another node of the set of executing nodes based on the pre-defined type of the computer transaction executable by the child node being a nested type of the computer transaction to the pre-defined type of the computer transaction executable by the other node of the set of executing nodes, the other node of the set of executing nodes being a parent node.

The controlling node is configured to maintain: a list of unique addresses for each of the set of executing nodes and a mapping of each specific node of the set of executing nodes and an associated pre-defined type of the computer transaction executable by the specific node of the set of executing nodes.

According to a first broad aspect of the present technology, there is provided a method of processing a transaction request, the transaction request being associated with a computer transaction which has to be executed in a succeed-or-fail-as-a-whole manner, the method executable in a distributed processing system having a plurality of nodes, the plurality of nodes including a controlling node and a set of executing nodes, each of the set of executing nodes: being associated with a pre-defined type of the computer transaction; is directly addressable by the controlling node; the set of executing nodes being organized in a hierarchy in accordance with the pre-defined type of the computer transaction executable by a given one of the set of executing nodes, such that: the given node of the set of executing nodes is a child node to another node of the set of executing nodes based on the pre-defined type of the computer transaction executable by the child node being a nested type of the computer transaction to the pre-defined type of the computer transaction executable by the other node of the set of executing nodes, the other node of the set of executing nodes being a parent node; the controlling node maintaining: a list of unique addresses for each of the set of executing nodes; and a mapping of each specific node of the set of executing nodes and an associated pre-defined type of the computer transaction executable by the specific node of the set of executing nodes; the controlling node of the distributed processing system accessible by a client device via a communication network; the distributed processing system further comprising a data storage device for storing data with which the computer transaction is executed by the distributed processing system; the method comprising: receiving by the controlling node, from the client device, a transaction request to modify at least a portion of the data maintained in the data storage device, the transaction request including an indication of the pre-defined type of the computer transaction to be executed; determining, by the controlling node, based on the pre-defined type of the computer transaction and the mapping, the specific node of the set of executing nodes responsible for the pre-defined type of the computer transaction; using the list of unique addresses, sending the transaction request directly to the determined specific node of the set of executing nodes for execution thereof; the sending the transaction request to the identified specific node of the set of executing nodes causing the identified specific node of the set of executing nodes to execute: blocking, by the identified specific node of the set of executing nodes, receiving of additional transaction requests until the transaction request is executed.

In some embodiments of the method, the blocking comprises: executing by the identified specific node of the set of executing nodes a mutual exclusion locking function.

In some embodiments of the method, the executing the mutual exclusion locking function comprises executing one of: a Dekker algorithm; a Peterson algorithm; a Lamport bakery algorithm; and a Szymanski algorithm.

In some embodiments of the method, the blocking further comprises: queuing one or more additional transaction requests received by the identified specific node of the set of executing nodes while executing the transaction request.

In some embodiments of the method, the method further comprises executing a sequentially next one of the one or more additional transaction requests after completing execution of the transaction request.

In some embodiments of the method, the blocking comprises: transmitting an indication that the transaction request is being processed by the identified specific node of the set of executing nodes to its parent node, in response to the transmitting, receiving a blocking instruction from the parent node.

In some embodiments of the method, the blocking instruction comprises a mutual exclusion locking type instruction.

In some embodiments of the method, the mutual exclusion locking type instruction is based on at least one of: a Dekker algorithm; a Peterson algorithm; a Lamport bakery algorithm; and a Szymanski algorithm.

In some embodiments of the method, the blocking further comprises: transmitting one or more additional transaction requests received by the identified specific node of the set of executing nodes while executing the transaction request to its parent node.

In some embodiments of the method, the transmitting one or more additional transaction requests received by the identified specific node of the set of executing nodes while executing the transaction request to its parent node causes the parent node to execute at least one of: queuing, by the parent node, the one or more additional transaction requests; re-assigning the one or more additional transaction requests to another child node configured to execute the pre-defined type of computer transaction.

In some embodiments of the method, the blocking further comprises: rejecting the one or more additional transaction requests received by the identified specific node of the set of executing nodes while executing the transaction request and returning the one or more additional transaction requests to the controlling node.

In some embodiments of the method, returning the one or more additional transaction requests to the controlling node causes the controlling node to execute at least one of: queuing, by the controlling node, the one or more additional transaction requests; periodically re-transmitting, by the controlling node, the one or more additional transaction requests to the identified specific node of the set of executing nodes until the identified specific node of the set of executing nodes executes the one or more additional transaction requests; re-assigning the one or more additional transaction requests to another executing node configured to execute the pre-defined type of computer transaction.

In some embodiments of the method, the blocking further comprises: analyzing the transaction request to determine the at least the portion of data to be modified by the transaction request; identifying, in the data storage device a memory location storing the at least the portion of data to be modified by the transaction request; reserving an exclusive right to read and write to the memory location, by the identified specific node of the set of executing nodes.

In some embodiments of the method, the method further comprises after the identified specific node of the set of executing nodes completes executing the transaction request: releasing the exclusive right to read and write to the memory location, by the identified specific node of the set of executing nodes.

In some embodiments of the method, the reserving the exclusive right to read and write to the memory location, by the identified specific node of the set of executing nodes comprises executing a mutual exclusion locking type function.

In some embodiments of the method, the executing the mutual exclusion locking type function comprises executing at least one of: a Dekker algorithm; a Peterson algorithm; a Lamport bakery algorithm; and a Szymanski algorithm.

In some embodiments of the method, the method further comprises: in response to the identified specific node of the set of executing nodes completing executing the transaction request: transmitting a transaction request execution message to the controlling node.

In some embodiments of the method, the transaction request execution message comprises one of: in response to an entirety of actions associated with the transaction request having been successfully executed, a transaction request success confirmation and an output of the execution of the transaction request; and in response to at least one action of the entirety of actions associated with the transaction request not having been successfully executed, a transaction request failure message.

In some embodiments of the method, the determining, by the controlling node, based on the pre-defined type of the computer transaction and the mapping, the specific node of the set of executing nodes responsible for the pre-defined type of the computer transaction comprises identification of a single specific node of the set of executing nodes responsible for the pre-defined type of the computer transaction.

In some embodiments of the method, the determining, by the controlling node, based on the pre-defined type of the computer transaction and the mapping, the specific node of the set of executing nodes responsible for the pre-defined type of the computer transaction comprises identification of a main pre-defined specific node of the set of executing nodes responsible for the pre-defined type of the computer transaction.

In accordance with another broad aspect of the present technology, there is provided distributed processing system comprising: a plurality of nodes, the plurality of nodes including a controlling node and a set of executing nodes, each of the set of executing nodes: being associated with a pre-defined type of a computer transaction, the computer transaction being of a type which has to be executed in a succeed-or-fail-as-a-whole manner; is directly addressable by the controlling node; the set of executing nodes being organized in a hierarchy in accordance with the pre-defined type of the computer transaction executable by a given one of the set of executing nodes, such that: the given node of the set of executing nodes is a child node to another node of the set of executing nodes based on the pre-defined type of the computer transaction executable by the child node being a nested type of the computer transaction to the pre-defined type of the computer transaction executable by the other node of the set of executing nodes, the other node of the set of executing nodes being a parent node; the controlling node maintaining: a list of unique addresses for each of the set of executing nodes; and a mapping of each specific node of the set of executing nodes and an associated pre-defined type of the computer transaction executable by the specific node of the set of executing nodes; a communication interface to enable the controlling node of the distributed processing system be accessible by a client device via a communication network; a data storage device for storing data with which the computer transaction is executed by the distributed processing system; the controlling node being configured to: receive from the client device, a transaction request to modify at least a portion of the data maintained in the data storage device, the transaction request including an indication of the pre-defined type of the computer transaction to be executed; determine, based on the pre-defined type of the computer transaction and the mapping, the specific node of the set of executing nodes responsible for the pre-defined type of the computer transaction; using the list of unique addresses, send the transaction request directly to the determined specific node of the set of executing nodes for execution thereof; the sending the transaction request to the identified specific node of the set of executing nodes causing the identified specific node of the set of executing nodes to execute: blocking, by the identified specific node of the set of executing nodes, receiving of additional transaction requests until the transaction request is executed.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first node" and "third node" is not intended to imply any particular order, type, chronology, hierarchy or ranking (for example) of/between the node, nor is their use (by itself) intended imply that any "second node" must necessarily exist in any given situation. Further, as is discussed herein in other contexts, reference to a "first" element and a "second" element does not preclude the two elements from being the same actual real-world element. Thus, for example, in some instances, a "first" node and a "second" node may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
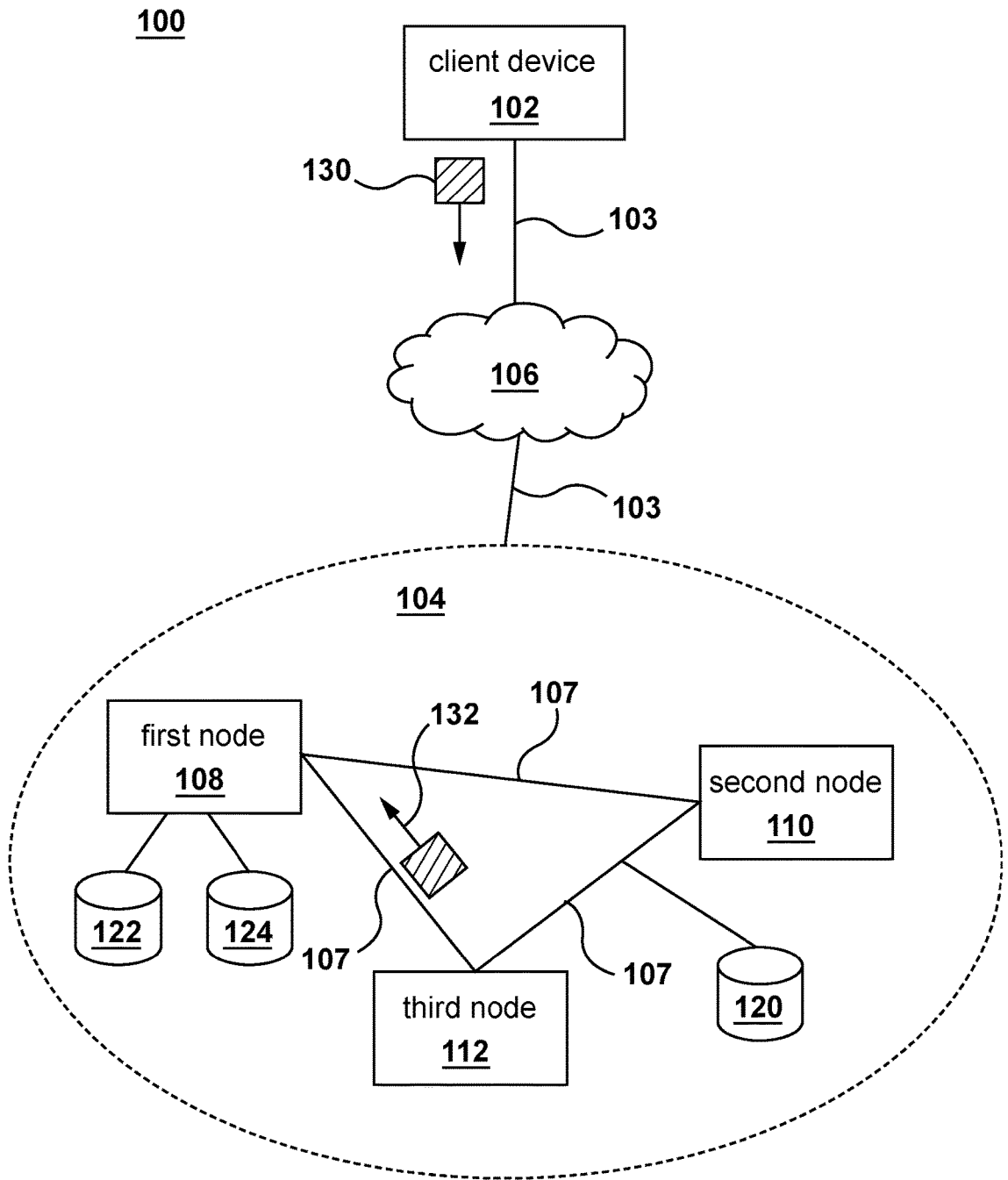
FIG. 1 depicts a system suitable for implementing non-limiting embodiments of the present technology and/or being used in conjunction with implementations of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any block-diagrams, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of block-diagram elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100 suitable for use with some implementations of the present technology. The system 100 may comprise inter alia a client device 102 coupled to a distributed processing system 104 via a communication network 106 and a communication link 103.

The distributed processing system 104 comprising a plurality of nodes: a first node 108, a second node 110 and a third node 112, interlinked by communication links 107. In the present context, the first node 108, the second node 110 and the third node 112 are examples of a plurality of nodes (not depicted), potentially present in the distributed processing system 104. It should be expressly understood that the distributed processing system 104 can comprise any other number of the plurality of nodes, the exact number of the plurality nodes depending on the processing requirements of the distributed processing system 104.

Each one of the client device 102, the first node 108, the second node 110 and the third node 112 of the system 100 may be situated in a single geographical location, such as in a computer cluster or computer grid. Alternatively, some or all of the client device 102, the first node 108, the second node 110 and the third node 112 may be distributed geographically across different devices and linked via the communication network 106 and/or other communication networks (not depicted), such as the internet.

In some embodiments, the system 100 may be implemented as a cloud server. In other embodiments, the system 100 may be implemented as a peer-to-peer network. Hence, in some embodiments of the present technology, the communication network 106 may be implemented as the Internet. In other embodiments of the present technology, the communication network 106 may be implemented differently, such as any wide-area communications network, local-area communications network, a private communications network and the like.

In the context of the current technology, the distributed processing system 104 may be considered to be a "distributed network" (also known as a "distributed system", and "distributed computing"). The term distributed network typically denotes a type of a system that comprises components that communicate and coordinate their actions by passing messages in order to achieve a common goal (such as, for example, execute a common task). The distributed processing system 104 may be situated in a single geographical location, such as in a computer cluster or computer grid, or may be distributed geographically across different devices and linked with communication links 107 over a communication network (not depicted), such as the internet. In the depicted non-limiting embodiment of present technology, the distributed processing system 104 includes the first node 108, the second 110 and the third node 112. The distributed processing system 104 may be configured to execute tasks sequentially, concurrently, in parallel or by any computing paradigm that would enable the distributed processing system 104 to execute tasks requested by the client device 102.

The implementation of the first node 108, the second node 110 and the third node 112 is well known to the person skilled in the art of the present technology. However, briefly speaking, the first node 108, the second node 110 and the third node 112 may each comprise a respective communication interface (not depicted) structured and configured to communicate with each other and various entities (such as the client device 102, for example and other devices potentially coupled to the distributed processing system 104) via communication links 107.

In the context of the present specification, a "node" may be a computer program that is running on appropriate hardware and is capable of receiving and transmitting requests (e.g. from client devices or other nodes) over a communication network 106, and carrying out those requests, or causing those requests to be carried out. In the present context, the use of the expression a "node" or a "server" is not intended to mean that every task (e.g. received instructions or requests) or any particular task will have been received, carried out, or caused to be carried out, by the same node (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers.

The first node 108, the second node 110 and the third node 112 may each be implemented as a conventional computer server. In an example of an embodiment of the present technology, the first node 108, the second node 110 and the third node 112 may each be implemented as a Dell™ PowerEdge™ Server running the Microsoft™ Windows Server™ operating system. Needless to say, the first node 108, the second node 110 and the third node 112 may be implemented in any other suitable hardware and/or software and/or firmware or a combination thereof.

The first node 108, the second node 110 and the third node 112 do not necessarily have to be implemented in the same hardware. The first node 108, the second node 110 and the third node 112 may not necessarily run on the same operating system (OS) or may not necessarily be programmed in the same programming language. The first node 108, the second node 110 and the third node 112 may be tightly coupled or loosely coupled. In the depicted non-limiting embodiment of present technology, the first node 108, the second node 110 and the third node 112 may each be physically independent servers, such as servers in a server rack. In other embodiments, the first node 108, the second node 110 and the third node 112 may run on the same server. In alternative non-limiting embodiments of the present technology, the functionality of each one of the first node 108, the second node 110 and the third node 112 may be distributed and may be implemented via multiple servers.

The distributed processing system 104 may be implemented on various communication layers, such as the application layer, the transport layer, the internet layer, the link layer and the physical layer, and according to various communication protocols or rules to encode and decode messages, which may depend on how the first node 108, the second node 110 and the third node 112 of the distributed processing system 104 are implemented. In some embodiments, the distributed processing system 104 may use the Internet protocol (IP) suite, also known as Transmission Control Protocol (TCP), commonly abbreviated as TCP/IP. TCP allows clients and nodes to exchange data in packets reliably and in an organized manner. In other embodiments, distributed processing system 104 may use the User Datagram Protocol (UDP). The first node 108, the second node 110 and the third node 112 may each respectively be interconnected by the communication links 107, the communication links 107 can be either wireless (such as the Wireless Fidelity, or WiFi®, Bluetooth® and the like) or wired (such as an Ethernet based connection), or a combination of wired and wireless.

The first node 108, the second node 110 and the third node 112 of the distributed processing system 104 may communicate using message passing. In various non-limiting embodiments of the present technology, such the message may comprise an indication of: a sender, a recipient and a content of the message. The sender is specified so the recipient knows which one of the first node 108, the second node 110 and the third node 112 sent the message, and the recipient is specified to know to which one of the first node 108, the second node 110 and the third node 112 the replies must be send. In some embodiments, a secure channel may be used to transfer messages, wherein messages may be encrypted before being sent and decrypted before being read, based on a shared secret or other known cryptographic methods.

In some embodiments, the message passing mechanism may be pure HTTP, remote procedure calls (RPC)-like connectors and message queues. A message may also include a unique message ID to identify the message, the content of previous action by any node of the distributed processing system 104 (i.e. the first node 108, the second node 110 and the third node 112), a priority number, a timestamp, a list of actions to be executed, instructions to send other messages, executable code, statistics about its sender such as average response time and other relevant information about the distributed processing system 104.

In the present context, broadcasting refers to a method of message passing by transferring a message to all other nodes (i.e. each one of the first node 108, the second node 110 and the third node 112) of the distributed processing system 104. Messages may be sent simultaneously or non-simultaneously. Broadcasting may be performed as "all scatter", wherein each sender node performs its own scatter in which messages may be distinct for each receiver, or "all broadcast", wherein the messages are the same for each receiver. In some embodiments, broadcasting may be replaced by unicasting, multicasting, unicasting or geocasting.

The implementation of the client device 102 is not particularly limited. As an example, the client device 102 may be configured to interact with the distributed processing system 104 by transmitting/receiving data to/from the distributed processing system 104 over the communication network 106 and the communication link 103. To that end, the client device 102 may comprise inter alia internal hardware components including one or more single or multi-core processors collectively referred to herein as processor (not depicted), a random access memory (not depicted), and a network interface (not depicted) for communicating with the distributed processing system 104.

In some embodiments, the client device 102 may have been programmed to provide commands and requests to the distributed processing system 104. Hence, in the context of the present specification, "client" or "client device" refers to a unit that consumes a service provided by the distributed processing system 104, and is any computer hardware that is capable of running software appropriate to the relevant task at hand. Thus, some (non-limiting) examples of client devices 102 include personal computers (desktops, laptops, netbooks, etc.), smartphones, and tablets, as well as network equipment such as routers, switches, and gateways.

It is noted that how the communication link 103 is implemented is not particularly limited and will depend on how the client device 102 and/or the distributed processing system 104 are implemented. Merely as an example and not as a limitation, in those embodiments of the present technology where the client device 102 is implemented as a desktop or laptop computer, the communication link 103 can be either wireless (such as the Wireless Fidelity, or WiFi®, Bluetooth® and the like) or wired (such as an Ethernet based connection). In other embodiments, where the client device may be implemented as a wireless communication device (such as a smart-phone), the communication link 103 may be implemented as a wireless communication link (such as but not limited to, a 3G communications network link, a 4G communications network link, a Wireless Fidelity, or WiFi®, Bluetooth® and the like).

It should be also noted that a device acting as the client device 102 in the present context is not precluded from acting as a node or server to other client devices (not depicted). In some embodiments, the client device 102 may be another distributed system (not depicted). In other embodiments, the client device 102 may run on the same machine as the distributed processing system 104 or any one of the first node 108, the second node 110, and the third node 112.

It should be expressly understood that implementations for the client device 102, the communication link 103, the communication network 106, and the distributed processing system 104 are provided for illustration purposes only. As such, those skilled in the art will easily appreciate other specific implementational details for the client device 102, the communication link 103, the communication network 106 and the distributed processing system 104. As such, by no means, examples provided herein above are meant to limit the scope of the present technology.

Generally, the client device 102 may trigger the distributed processing system 104 to execute a computer transaction by transmitting thereto a transaction request 130. The transaction request 130 identifies one or more operations to be performed, as well as which data the one or more operations are to be performed with (the data being stored in the distributed processing system 104).

The distributed processing system 104 further comprises a data storage device 120 accessible by the first node 108, the second node 110, and the third node 112 via the communication links 107. The data storage device 120 is configured to store data with which the computer transaction is to be executed by the distributed processing system 104. In other words, in response to a receipt of the transaction request 130, one of the plurality of nodes (i.e. one of the first node 108, the second node 110, and the third node 112) is configured to modify at least a portion of the data maintained in the data storage device 120 (as per the transaction request 130).

To that end, the transaction request 130 identifies what data needs to be modified and the one or more operations to be performed with the data as part of modifying the data. Based on the indication of one or more operations, the distributed processing system 104 can identify one or more pre-defined type of the computer transactions to be executed to give affect to the transaction request 130.

In accordance with embodiments of the present technology, one of the plurality of nodes (i.e. the first node 108, the second node 110 and the third node 112) is designated as a controlling node and the rest of the plurality of nodes (i.e. the first node 108, the second node 110 and the third node 112) is designated as a set of executing nodes. How the selection of the controlling node is executed is not particularly limited and any prior art technique can be used (such as leader consensus voting, and the like). It should be noted that the selection of a particular one of the plurality of nodes (i.e. the first node 108, the second node 110 and the third node 112) as the controlling node can be static (i.e. the selection of the controlling node is permanent) or dynamic (i.e. the selection of the controlling node can change over time, in response to the processing conditions, tasks to be performed, controlling node selection policy, and the like).

For the purposes of the description to be presented herein below, it shall be assumed that the first node 108 is the controlling node and that the second node 110 and the third node 112 form the set of executing nodes.

Each of the set of executing nodes (i.e. the second node 110 and the third node 112) is associated with a pre-defined type of the computer transaction that it is configured to execute. In a specific non-limiting embodiment of the present technology, the set of executing nodes (i.e. the second node 110 and the third node 112), as well as the distributed processing system 104 as a whole, is configured to execute one or more computer transactions which have to be executed in a "succeed-or-fail-as-a-whole" manner. In other words, the distributed processing system 104 is configured to process information processing operations that are divided into individual, indivisible computer operations typically referred to as "transactions". Each such transaction must succeed or fail as a complete unit. In other words, such the computer operation can not be "partially completed"—in response to at least one of the constituent transactions failing, the entire computer operation must fail.

It should be noted that embodiments of the present technology are not limited to any specific type of transaction processing. In other words, the nature of the data processed within the distributed processing system 104 is not limited.

The controlling node (i.e. the first node 108) is configured to organize the set of executing nodes (i.e. the second node 110 and the third node 112) in a hierarchy in accordance with the pre-defined type of the computer transaction executable by a given one of the set of executing nodes (i.e. the second node 110 and the third node 112). Generally speaking, the controlling node (i.e. the first node 108) is configured to define the hierarchy such that: the given node of the set of executing nodes (i.e. the second node 110 and the third node 112) is a child node to another node of the set of executing nodes (i.e. the second node 110 and the third node 112) based on the pre-defined type of the computer transaction executable by the child node being a nested type of the computer transaction to the pre-defined type of the computer transaction executable by the other node of the set of executing nodes, the other node of the set of executing nodes being a parent node.

Within embodiments of the present technology "nested" means to denote dependent on the parent transaction and/or being a sub-set of the parent transaction and/or being executable subsequent to the parent transaction. Just as an example, in the non-limiting embodiment where the distributed processing system 104 executes an on-line banking system, the controlling node (i.e. the first node 108) can define the hierarchy as follows. A given parent node (i.e. one of the second node 110 and the third node 112) can be responsible for accessing data associated with a checking account. One of the child nodes of the given parent node can be responsible for accessing data associated with US dollar as the currency, another child node of the given parent node can be responsible for accessing data associated with EURO as the currency. A given child of the one of the child nodes can be responsible for a credit processing function, while another given child of the one of the child nodes can be responsible for a debit processing function.

To this end, the controlling node (i.e. the first node 108) is configured to maintain a first mapping of one or more specific pre-defined type of the computer transaction executable by a given one of the set of executing nodes (i.e. the second node 110 and the third node 112).

Figure 2:
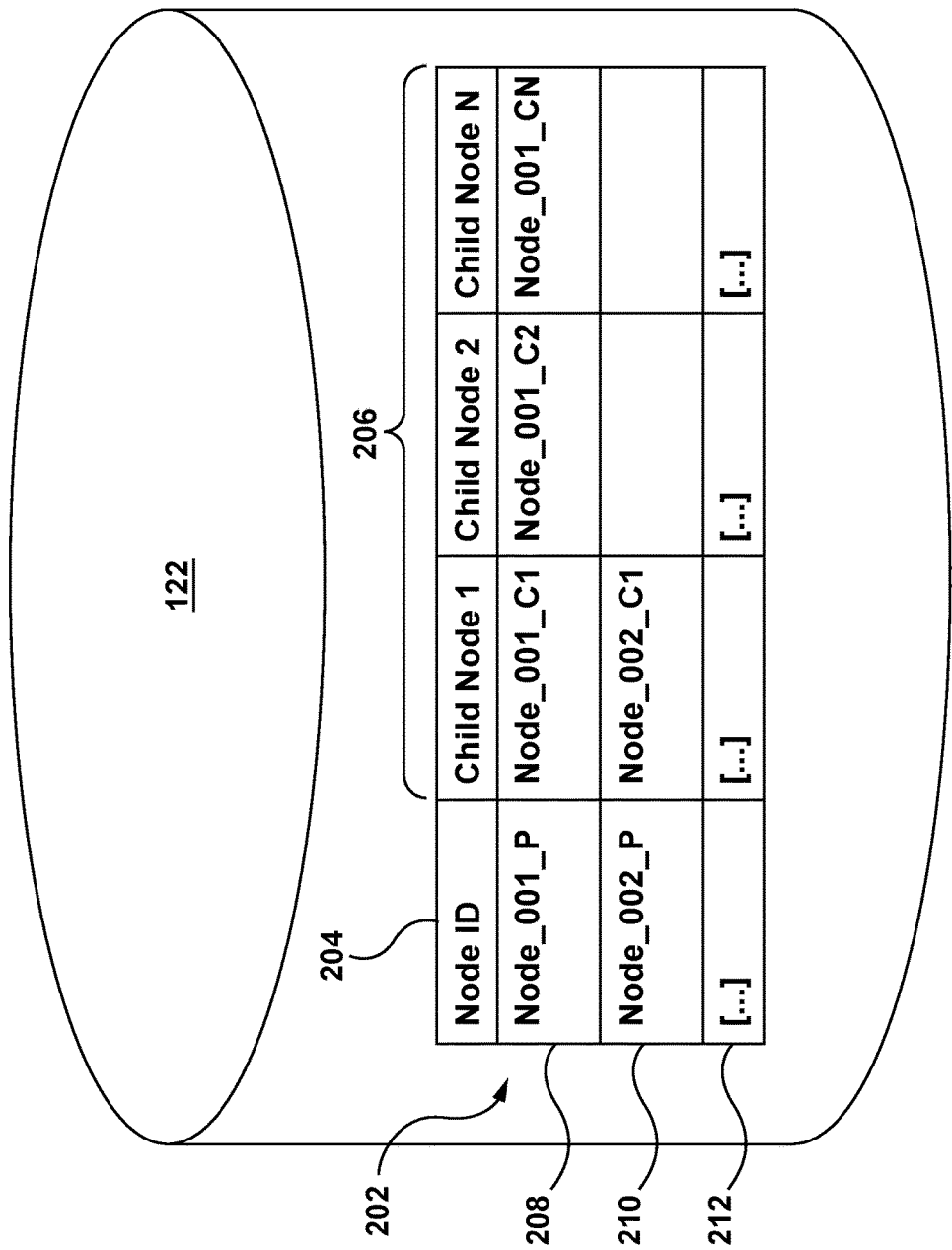
FIG. 2 depicts a hierarchy mapping maintained by a controlling node of the system of FIG. 1, the hierarchy mapping implemented in accordance with non-limiting embodiments of the present technology.

With continued reference to FIG. 1 and with brief reference to FIG. 2, there is depicted a hierarchy mapping 122 maintained by the controlling node (i.e. the first node 108). More specifically, the hierarchy mapping 122 maintains a mapping 202 of a given node identifier 204 to a set of its child nodes 206. To that end, the hierarchy mapping 122 maintains a first record 208 (associated, for example, with the second node 110), a second record 210 (associated, for example, with the third node 112), and a plurality of additional records 212 (associated with additional executing nodes of the set of executing nodes). Using the example of the first record 208, it maps the given node identifier 204 that uniquely identifies with the second node 110 within the distributed processing system 104 to its respective set of child nodes 206, which in this case contains unique identifiers of three child nodes.

If one compares the first record 208 to the second record 210 (associated with the third node 112), it should be clear that the number of child nodes for the given parent node does not need to be the same as the number of child nodes for another parent node. In the illustrated embodiment, the second node 110 has three child nodes and the third node 112 has one child node. As will be appreciated based on the above description, the number of child nodes within the set of child nodes 206 for the given parent node will depend on the type of transactions of the parent node (and thus, the type of nested transactions of the child nodes).

Additionally, each of the set of executing nodes (i.e. the second node 110 and the third node 112) is directly addressable by the controlling node (i.e. the first node 108). Within the non-limiting embodiments of the present technology, the term "directly addressable" is meant to denote that the controlling node (i.e. the first node 108) is configured to send a message to a specific one of the executing nodes (i.e. the second node 110 and the third node 112) without having to send the message to the specific one's parent node (although such messaging is not excluded by the direct addressing scheme).

To that end, the controlling node (i.e. the first node 108) is configured to maintain a list of unique addresses for each of the set of executing nodes (i.e. the second node 110 and the third node 112).

Figure 3:
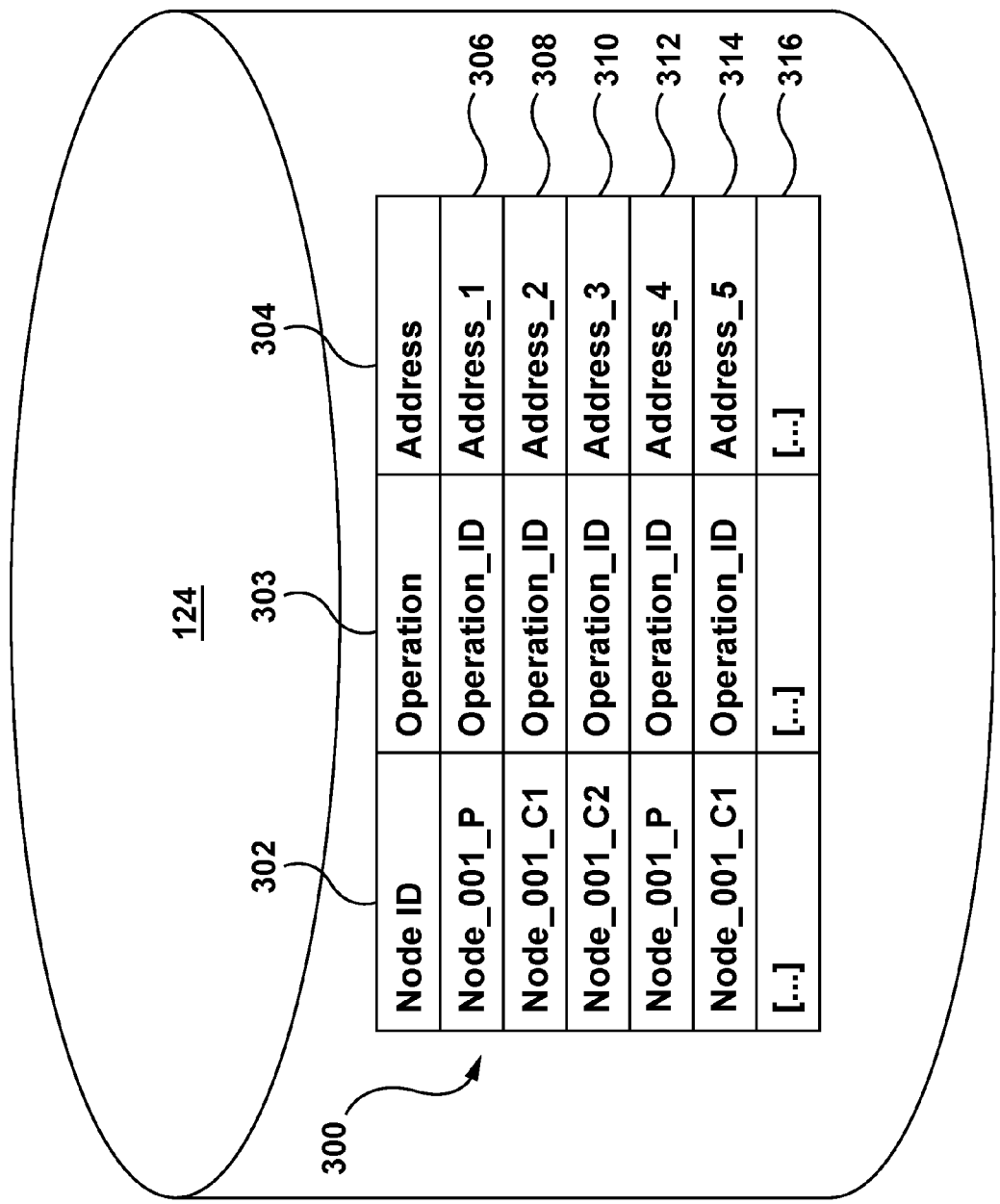
FIG. 3 depicts a unique address mapping maintained by the controlling node of the system of FIG. 1, the unique address mapping implemented in accordance with non-limiting embodiments of the present technology.

With reference to FIG. 3, there is depicted a unique address mapping 124. More specifically, the unique address mapping 124 maintains an address mapping 300 of a given node identifier 302, to an indication of an operation 303 and an address 304. To that end, the address mapping 300 maintains a first record 306 (associated, for example, with the second node 110), a second record 308 (associated, for example, with the third node 112), as well as a third record 310, a fourth record 312, a fifth record 314, and a plurality of additional records 316 respectively associated with additional executing nodes of the set of executing nodes.

Using the example of the first record 306, it maps the given node identifier 302 (it can be the same as the given node identifier 204 or a different one) that uniquely identifies with the second node 110 within the distributed processing system 104 to the one or more operations that the second node 110 is configured to execute, and a respective unique address that can be used to directly address the second node 110. It is noted that exact implementation of the node identifier 302 is not particular limited. In some embodiments of the present technology, the node identifier 302 can be implemented as an IP address. In other embodiments of the present technology, the node identifier 302 can be implemented as a MAC address. In yet additional embodiments of the present technology, the node identifier 302 can be implemented using other known techniques.

Figure 4:
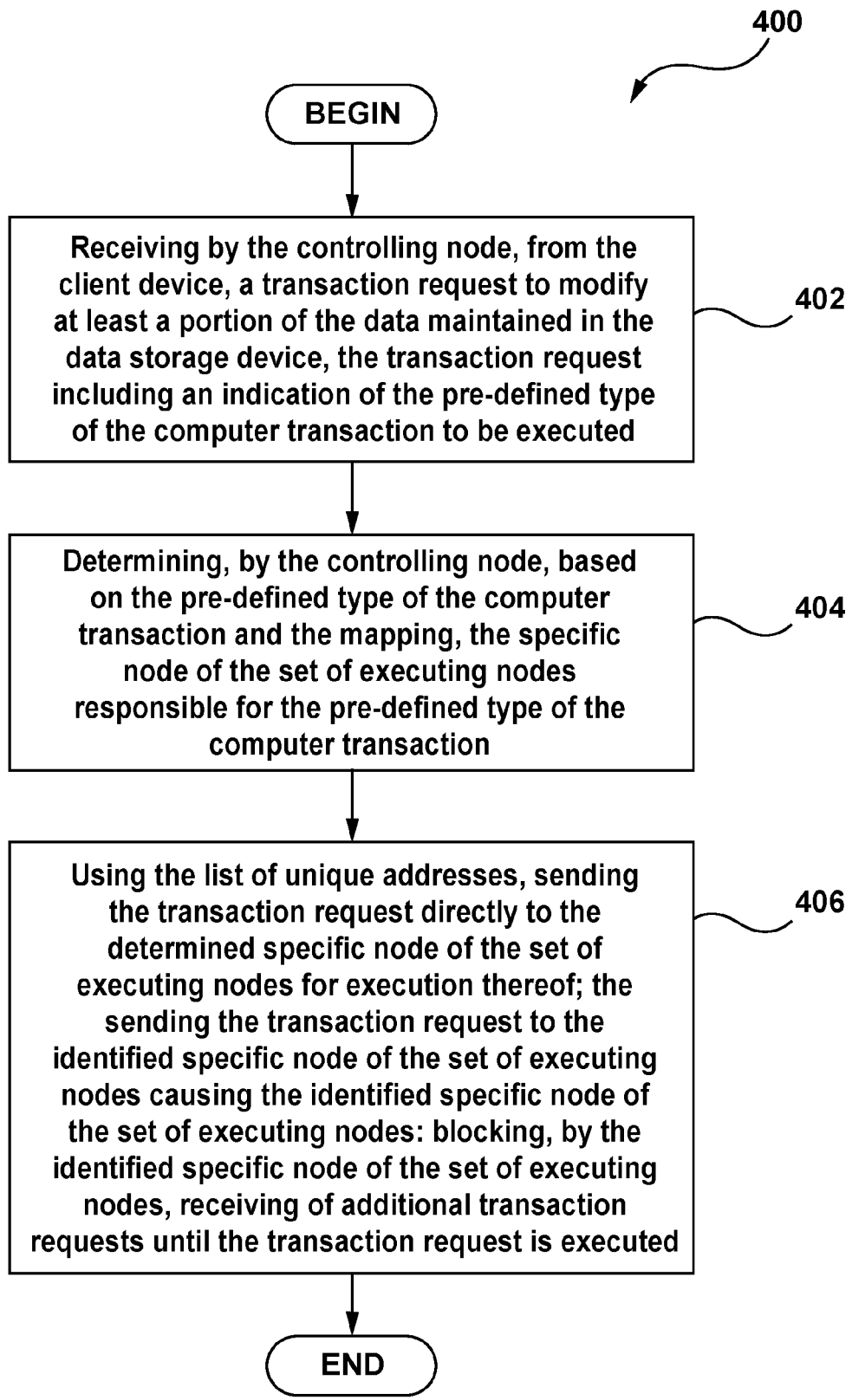
FIG. 4 depicts a block diagram of a method executed by the controlling node of FIG. 1, the method executable in accordance with non-limiting embodiments of the present technology.

Given the architecture described above, it is possible to execute a method for processing a transaction request. With reference to FIG. 4, there is depicted a block diagram of a non-limiting embodiment of a method 400. The method 400 can be executed by the controlling node (i.e. the first node 108).

Step 402—Receiving by the Controlling Node, from the Client Device, a Transaction Request to Modify at Least a Portion of the Data Maintained in the Data Storage Device, the Transaction Request Including an Indication of the Pre-Defined Type of the Computer Transaction to be Executed The method 400 begins at step 402, where the controlling node (i.e. the first node 108) receives, from the client device 102, the transaction request 130 to modify at least a portion of the data maintained in the data storage device 120, the transaction request 130 including an indication of the pre-defined type of the computer transaction to be executed.

The computer transaction can be of a type that has to be executed in a "succeed-or-fail-as-a-whole" manner. In other words, the distributed processing system 104 is configured to process information processing operations that are divided into individual, indivisible computer operations typically referred to as "transactions". Each such transaction must succeed or fail as a complete unit. In other words, such the computer operation can not be "partially completed"—in response to at least one of the constituent transactions failing, the entire computer operation must fail.

404—Determining, by the Controlling Node, Based on the Pre-Defined Type of the Computer Transaction and the Mapping, the Specific Node of the Set of Executing Nodes Responsible for the Pre-Defined Type of the Computer Transaction At step 404, the controlling node (i.e. the first node 108) determines, based on the pre-defined type of the computer transaction and the unique address mapping 124, the specific node of the set of executing nodes responsible for the pre-defined type of the computer transaction.

More specifically, the controlling node (i.e. the first node 108) determines, based on the operation 303 which of the executing nodes (i.e. the second node 110 and the third node 112) is responsible for the transaction contained in the transaction request 130. The controlling node (i.e. the first node 108) then retrieves the unique address of the identified node from the address 304.

In some embodiments of the method 400, the step of the determining, by the controlling node (i.e. the first node 108), based on the pre-defined type of the computer transaction and the unique address mapping 124, the specific node (i.e. the second node 110 and the third node 112) of the set of executing nodes responsible for the pre-defined type of the computer transaction comprises identification of a single specific node (i.e. the second node 110 and the third node 112) of the set of executing nodes responsible for the pre-defined type of the computer transaction.

In other embodiments of the method 400, the step of the determining, by the controlling node (i.e. the first node 108), based on the pre-defined type of the computer transaction and the unique address mapping 124, the specific node of the set of executing nodes (i.e. the second node 110 and the third node 112) responsible for the pre-defined type of the computer transaction comprises identification of a main pre-defined specific node (i.e. the second node 110 and the third node 112) of the set of executing nodes responsible for the pre-defined type of the computer transaction.

406—Using the List of Unique Addresses, Sending the Transaction Request Directly to the Determined Specific Node of the Set of Executing Nodes for Execution Thereof; the Sending the Transaction Request to the Identified Specific Node of the Set of Executing Nodes Causing the Identified Specific Node of the Set of Executing Nodes to Execute Blocking, by the Identified Specific Node of the Set of Executing Nodes, Receiving of Additional Transaction Requests Until the Transaction Request is Executed At step 406, the controlling node (i.e. the first node 108), using the so-determined address 304 (from the unique address mapping 124), sends the transaction request 130 directly to the determined specific node (i.e. the second node 110 and the third node 112) of the set of executing nodes for execution thereof; the sending the transaction request to the identified specific node (i.e. the second node 110 and the third node 112) of the set of executing nodes causing the identified specific node of the set of executing nodes to execute blocking, by the identified specific node (i.e. the second node 110 and the third node 112) of the set of executing nodes, receiving of additional transaction requests until the transaction request 130 is executed.

Blocking Executed by the Identified Specific Node (i.e. the Second Node 110 and the Third Node 112)

In some embodiments of the method 400, the step of blocking comprises executing by the identified specific node (i.e. the second node 110 and the third node 112) of the set of executing nodes a mutual exclusion locking function. The step of executing the mutual exclusion locking function comprises executing one of: a Dekker algorithm; a Peterson algorithm; a Lamport bakery algorithm; and a Szymanski algorithm.

In other embodiments of the method 400, the step of blocking further comprises queuing one or more additional transaction requests received by the identified specific node (i.e. the second node 110 and the third node 112) of the set of executing nodes while executing the transaction request. In some embodiments of the method 400, the method 400 further comprises executing a sequentially next one of the one or more additional transaction requests after completing execution of the transaction request.

Blocking Executed by a Parent Node of the Identified Specific Node (i.e. the Second Node 110 and the Third Node 112)

In some embodiments of the method 400, the step of blocking comprises transmitting an indication that the transaction request is being processed by the identified specific node (i.e. the second node 110 and the third node 112) of the set of executing nodes to its parent node, in response to the transmitting, receiving a blocking instruction from the parent node. In some embodiments of the method 400, the step of the blocking comprises a mutual exclusion locking type instruction. The mutual exclusion locking type instruction can be based on at least one of: a Dekker algorithm; a Peterson algorithm; a Lamport bakery algorithm; and a Szymanski algorithm.

In some embodiments of the method 400, the step of blocking further comprises transmitting one or more additional transaction requests received by the identified specific node (i.e. the second node 110 and the third node 112) of the set of executing nodes while executing the transaction request to its parent node.

In some embodiments of the method 400, the step of transmitting one or more additional transaction requests received by the identified specific node (i.e. the second node 110 and the third node 112) of the set of executing nodes while executing the transaction request to its parent node causes the parent node to execute at least one of: queuing, by the parent node, the one or more additional transaction requests; re-assigning the one or more additional transaction requests to another child node configured to execute the pre-defined type of computer transaction.

Blocking Executed by the Controlling Node (i.e. the First Node 108)

In some embodiments of the method 400, the step of blocking further comprises rejecting the one or more additional transaction requests received by the identified specific node (i.e. the second node 110 and the third node 112) of the set of executing nodes while executing the transaction request and returning the one or more additional transaction requests to the controlling node (i.e. the first node 108).

In some embodiments of the method 400, the step of returning the one or more additional transaction requests to the controlling node (i.e. the first node 108) causes the controlling node (i.e. the first node 108) to execute at least one of: queuing, by the controlling node (i.e. the first node 108), the one or more additional transaction requests; periodically re-transmitting, by the controlling node (i.e. the first node 108), the one or more additional transaction requests to the identified specific node of the set of executing nodes until the identified specific node (i.e. the second node 110 and the third node 112) of the set of executing nodes executes the one or more additional transaction requests; re-assigning the one or more additional transaction requests to another executing node configured to execute the pre-defined type of computer transaction.

In some embodiments of the present technology, in order to re-assign the one or more additional transaction requests to another executing node configured to execute the pre-defined type of computer transaction, the controlling node (i.e. the first node 108) can access the hierarchy mapping 122 to determine, for example, the parent node of the identified specific node (i.e. the second node 110 and the third node 112) of the set of executing nodes and transmit the request thereto. Alternatively, the controlling node (i.e. the first node 108) can access the unique address mapping 124 to determine another executing node that can execute the same type of transaction Data Processing In some embodiments of the method 400, the step of blocking further comprises: analyzing the transaction request 130 to determine the at least the portion of data to be modified by the transaction request 130; identifying, in the data storage device 120 a memory location storing the at least the portion of data to be modified by the transaction request; reserving an exclusive right to read and write to the memory location, by the identified specific node (i.e. the second node 110 and the third node 112) of the set of executing nodes.

In some embodiments of the method 400, the method 400 further comprises, after the identified specific node (i.e. the second node 110 and the third node 112) of the set of executing nodes completes executing the transaction request: releasing the exclusive right to read and write to the memory location.

In some embodiments of the method 400, the step of the reserving the exclusive right to read and write to the memory location, by the identified specific node (i.e. the second node 110 and the third node 112) of the set of executing nodes comprises executing a mutual exclusion locking type function. In some embodiments of the method 400, the step of the executing the mutual exclusion locking type function comprises executing at least one of: a Dekker algorithm; a Peterson algorithm; a Lamport bakery algorithm; and a Szymanski algorithm.

In some embodiments of the method 400, the method 400 further comprises: in response to the identified specific node (i.e. the second node 110 and the third node 112) of the set of executing nodes completing executing the transaction request: transmitting a transaction request execution message 132 (FIG. 1) to the controlling node (i.e. the first node 108).

In some embodiments of the method 400, the transaction request execution message 132 comprises one of: in response to an entirety of actions associated with the transaction request 130 having been successfully executed, a transaction request success confirmation and an output of the execution of the transaction request 130; and in response to at least one action of the entirety of actions associated with the transaction request not having been successfully executed, a transaction request failure message.

Some embodiments of the present technology can lead to a technical effect whereby server resources may be optimized and/or saved. Additionally or alternatively, embodiments of the present technology can make the process of client request execution faster compared to prior art approaches.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

While the above-described implementations have been described and shown with reference to particular steps performed in a particular order, it will be understood that these steps may be combined, subdivided, or reordered without departing from the teachings of the present technology. Accordingly, the order and grouping of the steps is not a limitation of the present technology.

One skilled in the art will appreciate when the instant description refers to "receiving data" from a user that the electronic device or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology will become apparent to those skilled in the art. The foregoing description is intended to be exemplary rather than limiting. The scope of the present technology is therefore intended to be limited solely by the scope of the appended claims.

What is claimed is:

1. A method of processing a transaction request associated with a computer transaction which has to be executed in a succeed-or-fail-as-a-whole manner, the method executable in a distributed processing system, the distributed processing system including:
    a plurality of nodes, the plurality of nodes including a controlling node and a set of executing nodes, wherein each of the set of executing nodes:
        being associated with a pre-defined type of the computer transaction;
        is directly addressable by the controlling node;
    the set of executing nodes being organized in a hierarchy in accordance with the pre-defined type of the computer transaction executable by a given one of the set of executing nodes, such that:
        the given node of the set of executing nodes is a child node to another node of the set of executing nodes based on the pre-defined type of the computer transaction executable by the child node being a nested type of the computer transaction to the pre-defined type of the computer transaction executable by the other node of the set of executing nodes, the other node of the set of executing nodes being a parent node;
    the controlling node maintaining:
        a list of unique addresses for each of the set of executing nodes; and
        a mapping of each specific node of the set of executing nodes and an associated pre-defined type of the computer transaction executable by the specific node of the set of executing nodes;
    the controlling node of the distributed processing system accessible by a client device via a communication network;
    a data storage device for storing data with which the computer transaction is executed by the distributed processing system;
the method comprising:
    receiving by the controlling node, from the client device, a transaction request to modify at least a portion of the data maintained in the data storage device, the transaction request including an indication of the pre-defined type of the computer transaction to be executed;
    determining, by the controlling node, based on the pre-defined type of the computer transaction and the mapping, the specific node of the set of executing nodes responsible for the pre-defined type of the computer transaction;
    using the list of unique addresses, sending the transaction request directly to the determined specific node of the set of executing nodes for execution thereof; the sending the transaction request to the identified specific node of the set of executing nodes causing the identified specific node of the set of executing nodes to execute:
        blocking, by the identified specific node of the set of executing nodes, receiving of additional transaction requests until the transaction request is executed.

2. The method of claim 1, wherein the blocking comprises:
    executing by the identified specific node of the set of executing nodes a mutual exclusion locking function.

3. The method of claim 2, wherein executing the mutual exclusion locking function comprises executing one of:
    a Dekker algorithm;
    a Peterson algorithm;
    a Lamport bakery algorithm; and
    a Szymanski algorithm.

4. The method of claim 1, wherein the blocking further comprises:
    queuing one or more additional transaction requests received by the identified specific node of the set of executing nodes while executing the transaction request.

5. The method of claim 4, further comprising executing a sequentially next one of the one or more additional transaction requests after completing execution of the transaction request.

6. The method of claim 1, wherein the blocking comprises:
    transmitting an indication that the transaction request is being processed by the identified specific node of the set of executing nodes to its parent node,
    in response to the transmitting, receiving a blocking instruction from the parent node.

7. The method of claim 6, wherein the blocking instruction comprises a mutual exclusion locking type instruction.

8. The method of claim 7, wherein the mutual exclusion locking type instruction is based on at least one of:
    a Dekker algorithm;
    a Peterson algorithm;
    a Lamport bakery algorithm; and
    a Szymanski algorithm.

9. The method of claim 1, wherein the blocking further comprises:
    transmitting one or more additional transaction requests received by the identified specific node of the set of executing nodes while executing the transaction request to its parent node.

10. The method of claim 9, wherein the transmitting one or more additional transaction requests received by the identified specific node of the set of executing nodes while executing the transaction request to its parent node causes the parent node to execute at least one of:
- queuing, by the parent node, the one or more additional transaction requests;
- re-assigning the one or more additional transaction requests to another child node configured to execute the pre-defined type of computer transaction.

11. The method of claim 1, wherein the blocking further comprises:
- rejecting the one or more additional transaction requests received by the identified specific node of the set of executing nodes while executing the transaction request and returning the one or more additional transaction requests to the controlling node.

12. The method of claim 11, wherein returning the one or more additional transaction requests to the controlling node causes the controlling node to execute at least one of:
- queuing, by the controlling node, the one or more additional transaction requests;
- periodically re-transmitting, by the controlling node, the one or more additional transaction requests to the identified specific node of the set of executing nodes until the identified specific node of the set of executing nodes executes the one or more additional transaction requests;
- re-assigning the one or more additional transaction requests to another executing node configured to execute the pre-defined type of computer transaction.

13. The method of claim 1, wherein the blocking further comprises:
- analyzing the transaction request to determine the at least the portion of data to be modified by the transaction request;
- identifying, in the data storage device a memory location storing the at least the portion of data to be modified by the transaction request;
- reserving an exclusive right to read and write to the memory location, by the identified specific node of the set of executing nodes.

14. The method of claim 13, further comprising, after the identified specific node of the set of executing nodes completes executing the transaction request:
- releasing the exclusive right to read and write to the memory location, by the identified specific node of the set of executing nodes.

15. The method of claim 13, wherein the reserving the exclusive right to read and write to the memory location, by the identified specific node of the set of executing nodes comprises executing a mutual exclusion locking type function.

16. The method of claim 15, wherein the executing the mutual exclusion locking type function comprises executing at least one of:
- a Dekker algorithm;
- a Peterson algorithm;
- a Lamport bakery algorithm; and
- a Szymanski algorithm.

17. The method of claim 1, wherein the method further comprises:
- in response to the identified specific node of the set of executing nodes completing executing the transaction request:
  - transmitting a transaction request execution message to the controlling node.

18. The method of claim 17, wherein transaction request execution message comprises one of:
- in response to an entirety of actions associated with the transaction request having been successfully executed, a transaction request success confirmation and an output of the execution of the transaction request; and
- in response to at least one action of the entirety of actions associated with the transaction request not having been successfully executed, a transaction request failure message.

19. The method of claim 1, wherein the determining, by the controlling node, based on the pre-defined type of the computer transaction and the mapping, the specific node of the set of executing nodes responsible for the pre-defined type of the computer transaction comprises one of:
- identification of a single specific node of the set of executing nodes responsible for the pre-defined type of the computer transaction; and
- identification of a main pre-defined specific node of the set of executing nodes responsible for the pre-defined type of the computer transaction.

20. A distributed processing system comprising:
- a plurality of nodes, the plurality of nodes including a controlling node and a set of executing nodes,
  - each of the set of executing nodes:
    - being associated with a pre-defined type of a computer transaction, the computer transaction being of a type which has to be executed in a succeed-or-fail-as-a-whole manner;
    - is directly addressable by the controlling node;
  - the set of executing nodes being organized in a hierarchy in accordance with the pre-defined type of the computer transaction executable by a given one of the set of executing nodes, such that:
    - the given node of the set of executing nodes is a child node to another node of the set of executing nodes based on the pre-defined type of the computer transaction executable by the child node being a nested type of the computer transaction to the pre-defined type of the computer transaction executable by the other node of the set of executing nodes, the other node of the set of executing nodes being a parent node;
  - the controlling node maintaining:
    - a list of unique addresses for each of the set of executing nodes; and
    - a mapping of each specific node of the set of executing nodes and an associated pre-defined type of the computer transaction executable by the specific node of the set of executing nodes;
- a communication interface to enable the controlling node of the distributed processing system be accessible by a client device via a communication network;
- a data storage device for storing data with which the computer transaction is executed by the distributed processing system;
- the controlling node being configured to:
  - receive from the client device, a transaction request to modify at least a portion of the data maintained in the data storage device, the transaction request including an indication of the pre-defined type of the computer transaction to be executed;
  - determine, based on the pre-defined type of the computer transaction and the mapping, the specific node of the set of executing nodes responsible for the pre-defined type of the computer transaction;
  - using the list of unique addresses, send the transaction request directly to the determined specific node of the set of executing nodes for execution thereof; the sending the transaction request to the identified specific node of the set of executing nodes causing the identified specific node of the set of executing nodes:
blocking, by the identified specific node of the set of executing nodes, receiving of additional transaction requests until the transaction request is executed.

\* \* \* \* \*